(12) United States Patent
Ratanaphanyarat et al.

(10) Patent No.: US 10,802,499 B2
(45) Date of Patent: *Oct. 13, 2020

(54) AUTONOMOUS MODULAR ROBOT

(71) Applicant: ViaBot Inc., Palo Alto, CA (US)

(72) Inventors: Gregg Ratanaphanyarat, Palo Alto, CA (US); Dawei Ding, Palo Alto, CA (US)

(73) Assignee: ViaBot Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/247,482

(22) Filed: Jan. 14, 2019

(65) Prior Publication Data
US 2019/0384315 A1    Dec. 19, 2019

Related U.S. Application Data

(63) Continuation of application No. 15/152,100, filed on May 11, 2016, now Pat. No. 10,180,685, which is a (Continued)

(51) Int. Cl.
*G05D 1/02* (2020.01)
*B25J 5/00* (2006.01)
(Continued)

(52) U.S. Cl.
CPC ............ *G05D 1/0246* (2013.01); *B25J 5/007* (2013.01); *B25J 9/023* (2013.01); *B25J 19/023* (2013.01);
(Continued)

(58) Field of Classification Search
CPC ........... G05D 1/0246; G05D 2201/0203; B25J 19/023; B25J 9/023; B25J 5/007
See application file for complete search history.

(56) References Cited

U.S. PATENT DOCUMENTS

| 4,993,139 A | 2/1991 | Burry et al. |
| 5,927,736 A | 7/1999 | Salfinger et al. |

(Continued)

FOREIGN PATENT DOCUMENTS

| CN | 202000724 U | 10/2011 |
| CN | 102578958 A | 7/2012 |

(Continued)

OTHER PUBLICATIONS

Taiwanese Office Action received in Taiwanese Application No. 105114672 dated Jun. 8, 2017 in 8 pages.
(Continued)

*Primary Examiner* — Thomas Ingram
(74) *Attorney, Agent, or Firm* — Penilla IP, APC

(57) ABSTRACT

An autonomous modular robot includes an attachment retention system that for retaining two or more interchangeable attachments for performing unique tasks, e.g., steam cleaning, vacuuming, grass cutting, etc. The attachments may be sequentially positioned in the path of travel of the robot and configured to perform complementary tasks. For example, for cleaning a floor, a first attachment may be configured to vacuum the floor and a second attachment may be configured for steam cleaning the floor. The robot may also include a vertically translatable lift mechanism. The lift mechanism may include the attachment retention system, thereby allowing the attachments to be moved vertically. The lift mechanism may also include a dimension sensor proximate a top of the lift mechanism. The dimension sensor may be utilized to determine the size, e.g., a height and/or a width of the robot with any retained attachments, to help navigate the robot and avoid obstacles.

21 Claims, 8 Drawing Sheets

Related U.S. Application Data continuation-in-part of application No. 14/937,633, filed on Nov. 10, 2015, now abandoned.

(60) Provisional application No. 62/160,059, filed on May 12, 2015, provisional application No. 62/200,814, filed on Aug. 4, 2015.

(51) Int. Cl.
*B25J 9/02* (2006.01)
*B25J 19/02* (2006.01)

(52) U.S. Cl.
CPC ..... *G05D 2201/0203* (2013.01); *Y10S 901/01* (2013.01)

(56) References Cited

U.S. PATENT DOCUMENTS

| | | | |
|---|---|---|---|
| 6,113,343 | A | 9/2000 | Goldenberg et al. |
| 7,117,660 | B1 | 10/2006 | Colens |
| 7,352,153 | B2 | 4/2008 | Yan |
| 7,555,363 | B2 * | 6/2009 | Augenbraun ........... A47L 5/225 |
| | | | 700/253 |
| 7,805,220 | B2 | 9/2010 | Taylor et al. |
| 8,052,120 | B2 | 11/2011 | Bacon |
| 8,353,373 | B2 | 1/2013 | Rudakevych |
| 8,584,307 | B2 | 11/2013 | Won et al. |
| 8,666,550 | B2 | 3/2014 | Anderson et al. |
| 8,961,695 | B2 | 2/2015 | Romanov et al. |
| 9,096,375 | B2 | 8/2015 | Lert et al. |
| 2002/0116089 | A1 | 8/2002 | Kirkpatrick, Jr. |
| 2006/0288519 | A1 | 12/2006 | Jaworski et al. |
| 2009/0082879 | A1 | 3/2009 | Dooley et al. |
| 2009/0218149 | A1 * | 9/2009 | Ko ........................ E01C 23/00 |
| | | | 180/65.1 |
| 2009/0271661 | A1 | 10/2009 | Miyai et al. |
| 2011/0168460 | A1 | 7/2011 | Goldenberg et al. |
| 2011/0202175 | A1 * | 8/2011 | Romanov ........... A47L 11/4011 |
| | | | 700/250 |
| 2012/0016520 | A1 | 1/2012 | Hutcheson et al. |
| 2013/0226342 | A1 | 8/2013 | Green et al. |
| 2014/0031977 | A1 | 1/2014 | Goldenberg et al. |
| 2014/0121881 | A1 | 5/2014 | Diazdelcastillo |
| 2014/0277691 | A1 * | 9/2014 | Jacobus ............... G06Q 10/087 |
| | | | 700/216 |
| 2014/0341695 | A1 | 11/2014 | Girtman et al. |
| 2015/0012163 | A1 | 1/2015 | Crawley |
| 2015/0032252 | A1 | 1/2015 | Galluzzo et al. |
| 2016/0271795 | A1 | 9/2016 | Vicenti |
| 2017/0038772 | A1 * | 2/2017 | Ratanaphanyarat .... B60L 53/80 |

FOREIGN PATENT DOCUMENTS

| | | |
|---|---|---|
| CN | 203000793 U | 6/2013 |
| CN | 103505157 A | 1/2014 |
| CN | 104433967 A | 3/2015 |
| DE | 10 2009 027 557 A1 | 1/2011 |
| WO | WO 95/09557 | 4/1995 |
| WO | WO 97/49528 A1 | 12/1997 |
| WO | WO 2007/028049 A2 | 3/2007 |
| WO | WO 2009/030108 A1 | 3/2009 |
| WO | WO 2014/007729 A1 | 1/2014 |
| WO | WO 2015/002826 A1 | 1/2015 |
| WO | WO 2015/049136 A2 | 4/2015 |

OTHER PUBLICATIONS

Yim, Mark et al. "Modular Self-Reconfigurable Robot Systems", IEEE Robotics & Automation Magazine, p. 43-52, Mar. 2007.
Yim, Mark et al., "PolyBot: a Modular Reconfigurable Robot", IEEE International Conference on Robotics & Automation, p. 514-250, Apr. 2000.
International Search Report and the Written Opinion dated Dec. 28, 2016 in PCT Application No. PCT/US16/31933.
Taiwan Official Search Report dated Sep. 10, 2019.
Notification of the First Office Action dated Nov. 25, 2019 in Chinese Patent Application No. 201680040511.3.

* cited by examiner

AUTONOMOUS MODULAR ROBOT

REFERENCE TO RELATED APPLICATIONS

This application is a continuation of U.S. patent application Ser. No. 15/152,100, filed May 11, 2016, wherein U.S. patent application Ser. No. 15/152,100 is a continuation-in-part of U.S. patent application Ser. No. 14/937,633, filed Nov. 10, 2015, and claims the priority benefit under 35 U.S.C. § 119(e) of U.S. Provisional Patent Application No. 62/160,059, filed May 12, 2015; and U.S. Provisional Patent Application No. 62/200,814, filed Aug. 4, 2015.

FIELD

The present disclosure relates generally to a multifunctional robot and, more specifically, to a modular robot configured to accept a plurality of interchangeable attachments that may be configured to perform a variety of functions.

BACKGROUND

Autonomous robots are becoming increasingly prevalent due to their ability to automatically perform a variety of tasks that are typically performed manually by humans, or that have been performed with direct human control of a robot. A simple example of an autonomous robot is a robotic floor cleaner such as a robotic vacuum or a robotic mop. These robots are often programmable, allowing users to configure operation times, frequency of operation, and various other settings for the robots. Once programmed, the robots may perform a task, move, and interact with the surrounding environment without requiring further human input. While such robots are becoming more prevalent, the robots are often designed to perform only a single function, such as to clean a surface. As a result, performing a variety of tasks may be difficult and/or prohibitively expensive due to the need to acquire a dedicated autonomous robot for each task that the user wishes to complete.

SUMMARY

In some embodiments, an autonomous modular robot is provided. The robot comprises a main body; a drive system attached to the main body; an attachment retention system; and a control system. The drive system is configured to move the main body. The attachment retention system is configured to couple two or more interchangeable attachments to the main body, and each of the interchangeable attachments may be configured to perform a task. The control system may be configured to autonomously control the drive system and the interchangeable attachments upon coupling of the interchangeable attachments to the main body. The robot may also include a lift mechanism that allows the interchangeable attachments to be moved, e.g., vertically open and down, laterally hack-and-forth, or tilted from side to side, all while the robot remains stationary or in combination with movement of the robot.

Figure 1A:
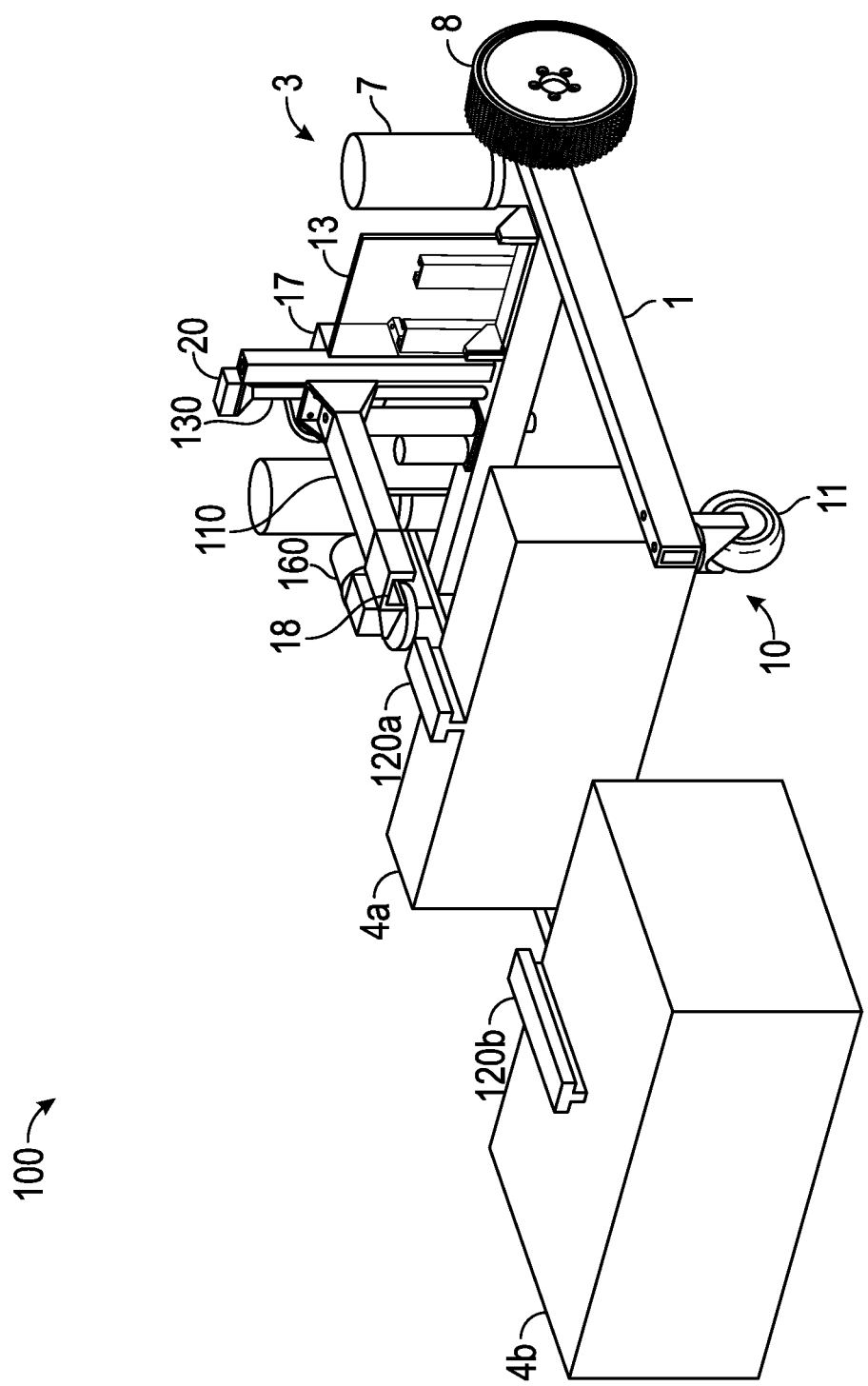
FIG. 1A is a front perspective view of an example of an autonomous robot according to some embodiments.

The drawings are provided to illustrate example of embodiments and are not intended to limit the scope of the disclosure. In addition, features in the drawings are not necessarily to scale.

DETAILED DESCRIPTION

In some embodiments, an autonomous modular robot includes an attachment retention system that allows the robot to simultaneously retain two or more interchangeable attachments for performing tasks. The interchangeable attachments may each be configured to perform a unique task, e.g., steam cleaning, vacuuming, grass cutting, polishing, polishing, driveway and/or street cleaning (e.g., sweeping), package grasping and/or moving, etc. In some embodiments, the interchangeable attachments may be retained such that they are disposed sequentially in the path of travel of the robot. For example, a first interchangeable attachment may be retained directly in front of a second interchangeable attachment, with both interchangeable attachments being in the same line on the path of travel of the robot. The interchangeable attachments may be configured to perform complementary tasks. For example, for cleaning a floor, the first interchangeable attachment may be configured to vacuum the floor and the second interchangeable attachment may be configured to steam clean the floor.

Preferably, the interchangeable attachments may be automatically loaded and unloaded from the robot at a docking or base station. The loading and unloading may be performed autonomously, with the robot automatically aligning itself and loading or unloading an interchangeable attachment as needed to accomplish the job assignment that the robot has been programmed to perform.

In some embodiments, the robot may include a lift mechanism that may be translated vertically, tilted, rotated, and/or moved forwards or backwards. The lift mechanism may include the attachment retention system, thereby allowing the interchangeable attachments to be moved vertically. This vertical movement may be utilized as part of perform a task and/or to accommodate interchangeable attachments of different sizes.

It will be appreciated that movement of the lift mechanism access or retention of interchangeable attachments may change the physical dimensions of the robot. Such a change in dimensions may impact the movement of the robot and the robot's clearance with obstacles in its path. Preferably, the lift mechanism includes a dimension sensor proximate a top of the lift mechanism. The dimension sensor may be utilized to determine the size, e.g., a height and/or a width of the robot with any retained interchangeable attachments, to help navigate the robot and avoid obstacles.

Advantageously, the robot allows for its functionality to completely change using the interchangeable attachments. Moreover, the ability to provide multiple attachments may increase the effectiveness of the robot in performing certain assignments. For example, the attachments may perform complementary tasks (were performing one task increases the efficacy of performing another task) to more effectively accomplish a particular assignment, such as cleaning a floor. In addition, the lift mechanism allows for both the ability to perform tasks that require vertical movement and the ability to accommodate a wide range of attachments having different heights. In some embodiments, the dimension sensor advantageously maintains the compactness of the device by allowing a single sensor that may aid both operation and navigation of the device.

Reference will now be made to the drawings, in which like reference numerals refer to like parts throughout.

FIG. 1A shows an example of a perspective view of an autonomous modular robot 100. The robot 100 includes a main body 1, interchangeable attachments 4a and 4b, a drive system 7, a front support system 10 for supporting the front end of the robot off the ground, an electronic control system 13, and a primary power supply 17. The main body 1 functions as a base or frame onto and within which the remaining components may be situated and attached. The drive system 7 is mounted to the main body 1, adjacent to a back end 3 of the main body 1. In some embodiments, the back end 3 may correspond to the front end of the robot 100; that is, the robot 100 may be configured to typically travel in a direction such that the back end 3 is at the front of the robot 100.

With continued reference to FIG. 1A, the drive system 7 provides mobility to the robot 100 across an underlying surface. In some embodiments, the drive system 7 includes wheels 8. Rotation of these wheels 8 allows the main body 1 to traverse a surface. The support system 10 maybe mounted to the main body 1, offset from the drive system 7, e.g., the support system 10 may be positioned proximate an opposite end of the robot 100 from the wheels 8. In some embodiments, the support system 10 may include a rotatable or non-rotatable wheel 11, e.g., two spaced-apart wheels arranged on different sides of interchangeable attachments 4a, 4b. In some other embodiments, the support system 10 may omit wheels and include one or more low friction pads for contacting and sliding across a surface.

In some embodiments where the wheel 11 is rotatable, the support system 10 may function as a steering system, with rotatable wheels that turn and point in different directions as desired. In such embodiments, the support system 10 may help the robot 100 to navigate across a surface and may aid functions such as turning and changing the direction of travel of the robot 100. As such, the support system 10 may aid in changing the lateral direction in which the robot is moving when moving in a forward direction as well as in a backward direction. In some embodiments, both the support system 10 and the drive system 7 may have rotatable wheels, which may be used to increase the mobility of the robot 100, while decreasing the turning radius of the robot 100.

The interchangeable attachments 4a, 4b provide a level of modularity and variety of functionality to the robot 100. In some embodiments, the interchangeable attachments 4a, 4b allows the functionality and utility of the robot 100 to be entirely changed, depending upon the attachments 4a, 4b that are coupled to the main body 1. As shown in FIG. 1A, the interchangeable attachments 4a, 4b may be removably mounted to the main body 1 to alter the functionality of the robot 100 as desired.

In some embodiments, the robot 100 includes a laterally extending support structure 110 mounted to the main body 1 and configured to retain the interchangeable attachments 4a, 4b. In some embodiments, the laterally extending support structure 110 may take the form of a bar or rail having a channel 18 into which a corresponding protrusion 120a or 120b may fit. This channel 18 provides a cavity into which the interchangeable attachments 4a, 4b may be mounted. The interchangeable attachments 4a, 4b may be operatively engaged into the attachment retention channel 18. This allows the attachment retention channel 18 to be used to structurally secure the interchangeable attachments 4a, 4b and for the interchangeable attachments 4a, 4b to be easily removed from the main body 1 when altering the functionality of the robot 100. In some embodiments, the attachments 4a, 4b may be installed or removed by simply sliding into or out of, respectively, the retention channel 18. As an example, the protrusions 120a, 120b have a T-shaped cross-sectional profile, which fits into a T-shaped open volume in the channel 18. The attachment retention channel 18 may include a mechanism, e.g. a latch, for securing the interchangeable attachments 4a, 4b in place once the interchangeable attachments 4a, 4b is mounted. Thus, the attachment retention channel 18 enables the interchangeable attachments 4a, 4b to be coupled to the main body 1 and to securely hold the interchangeable attachments 4a, 4b in place during operation of the robot 100. Additionally, the attachment retention channel 18 may include sensors to ensure that the interchangeable attachments 4a, 4b are properly aligned for mounting.

The attachment retention channel 18 may traverse substantially an entire length of the support 110. Advantageously, the lateral extension of the retention channel 18 allows multiple attachments 4a, 4b to be coupled to the main body 1, and also allows for additional interchangeable attachments to be coupled to the main body 1. For example, to accommodate additional interchangeable attachments, the support structure 110 may simply be lengthened. In some embodiments, the support structure 110 may be detachable and a support structure of an appropriate length may be installed depending upon the dimensions of and/or the number of interchangeable attachments that will be coupled to the main body 1. In some other embodiments, counterweights (not illustrated) may be attached proximate to the end 3 of the robot 100 to balance the robot 100. In some embodiments, the robot 100 may be configured to accommodate two or more, or 3 or more, interchangeable attachments.

In some embodiments, the support structure 110 is mounted to a lift mechanism 130, which can be moved vertically. The lift mechanism 130 may move to change the vertical height of the interchangeable attachments 4a, 4b after retaining those attachments in the support structure 110, and/or may be moved to accommodate the heights of different attachments 4a 4b. In some embodiments, in addition to or as an alternative to vertical movement, the lift mechanism may tilt and/or rotate to, e.g., lift up a side, back, and/or front of a retained interchangeable attachment 4a, 4b.

In some embodiments, the lift mechanism may also include an actuator 160 for extending the support structure 110 laterally. Such lateral extension may be used to accommodate deeper interchangeable attachments 4a, 4b and/or to move objects that are being manipulated by the robot 100. For example, in some embodiments, one or more of the interchangeable attachments 4a, 4b may include an adapter or grasping device for holding an object. The lift mechanism may be utilized to move this object vertically, laterally, and/or to tilt the object.

With continued reference to FIG. 1A, the electronic control system 13 may be configured to control the robot 100 during operation. In some embodiments, the electronic control system 13 may be mounted on the main body 1, adjacent to the drive system 7, between the wheels 8. The electronic control system 13 may thus be protected within the main body 1 from the external environment, including collisions with objects in the external environment.

Figure 3:
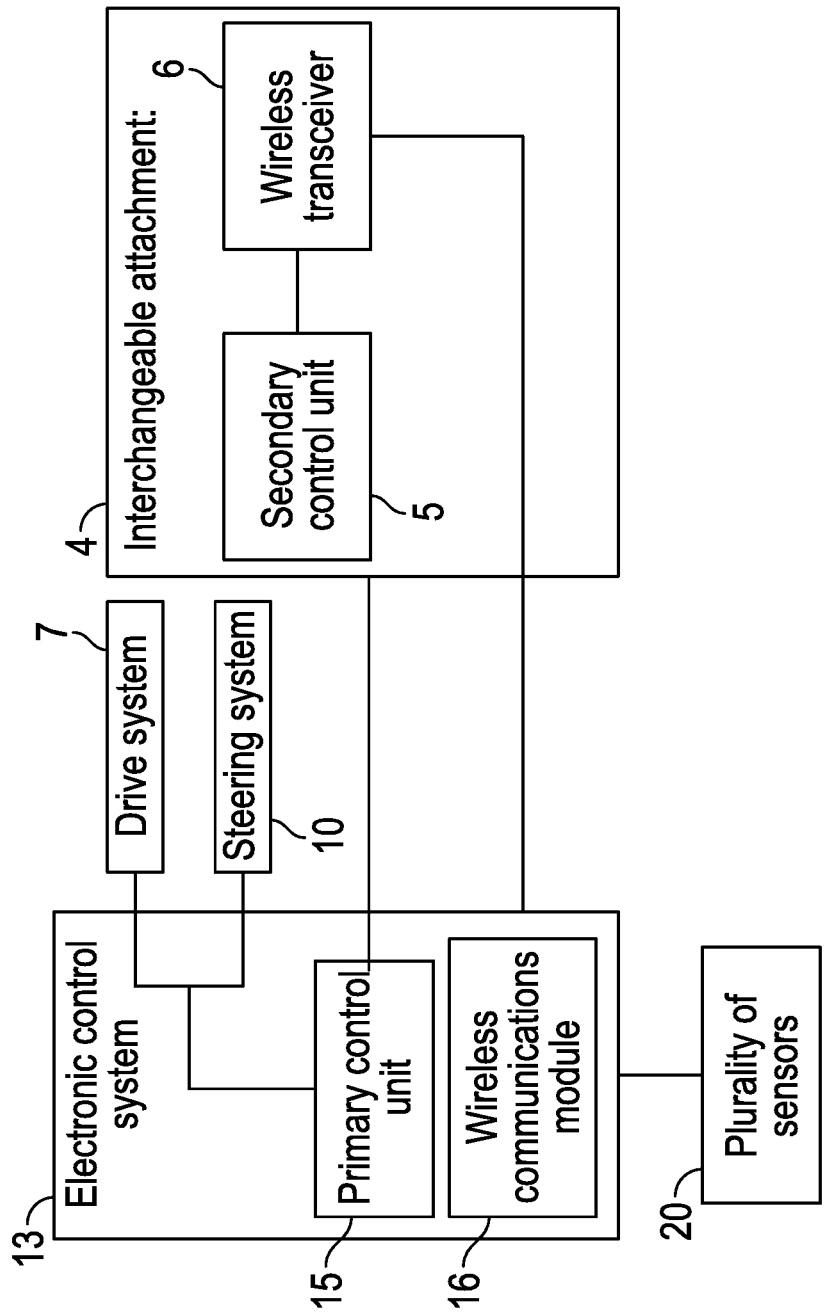
FIG. 3 is an example of a schematic diagram depicting electronic connections for an autonomous robot according to some embodiments.

An example of electronic connections for the electronic control system 13 is schematically shown in FIG. 3. The electronic control system 13 may be wired to the drive system 7, or alternatively, control over the drive system 7 may be wirelessly established using the wireless communications module 16. The electronic control system 13 may also be configured to communicate with the interchangeable attachments 4a, 4b in order to regulate the various functions of the robot 100 that are available using the interchangeable attachments 4a, 4b. As such, the electronic control system 13 may be electronically connected to the drive system 7, and the interchangeable attachments 4a, 4b in order to enable the electronic control system 13 to regulate the drive system 7, as well as the interchangeable attachments 4a, 4b during operation of the robot 100. In embodiments where the support system 10 includes active components, such as embodiments where the support system 10 functions as a steering system, the electronic control system 13 may also be connected (via wired and/or wireless connections) to the support system 10. The connection allows the electronic control system 13 to control the support system 10, e.g., thereby allowing changes in the direction and/or rotation of one or more wheels of the support system.

With continued reference to FIG. 3, the interchangeable attachments 4a, 4b may comprise a secondary control unit 5 and a wireless transceiver 6. The wireless communications module 16 of the electronic control system 13 allows communications with the wireless transceiver 6. In turn, the wireless transceiver 6 may be in electrical communication with the secondary control unit 5 of the interchangeable attachment. Thus, the primary control unit 15 may control the drive system 7 (and the support system 10 in embodiments where the support system 10 includes active components), as well as the interchangeable attachments 4a, 4b through the secondary control unit 5. The wireless communications module 16 and the wireless transceiver 6 enable wireless communication between the electronic control system 13 and the interchangeable attachments 4a, 4b. Additionally, the wireless communications module 16 allows the electronic control system 13 to receive commands from an external source such as a user computing device through a network, e.g., Wi-Fi, Bluetooth, etc. In some embodiments, the wireless communications module 16 enables remote user control or programming of the robot 100. The wireless communications module 16 may be communicatively coupled to the wireless transceiver 6 and commands may be wirelessly transmitted from the electronic control system 13 to the interchangeable attachments 4a, 4h. The wireless transceiver 6 may be electronically connected to the secondary control unit 5. Commands that are wirelessly received from the electronic control system 13 may thus be implemented through the secondary control unit 5, allowing the electronic control system 13 to wirelessly control the interchangeable attachments 4a, 4b. The wireless transceiver 6 additionally enables the interchangeable attachments 4a, 4b to wirelessly communicate with other ones of the interchangeable attachments 4a, 4b, to allow the execution of tasks to be coordinated. The wireless communications module 16 and the wireless transceiver 6 may additionally allow for system updates to be downloaded and applied to the primary control unit 15 and/or the secondary control unit 5. Such system updates may be accepted and implemented wirelessly through a user computing device.

In some embodiments, rather than wireless communications, a physical connection may be made between the interchangeable attachment and electronic control system. For example, the wireless communications module 16 and the transceiver 6 may simply be communications units that are connected together by wiring. In some embodiments, electrodes may be present in the attachment retention channel 18 and the protrusions 120a, 120b. Once locked into place inside the retention channel 18, the electrodes on the protrusions 120a, 120b may mate and provide electrical contact with corresponding electrodes in the retention channel 18, thereby forming a communications channel between the electronic control system 13 and the interchangeable attachment 4a or 4b.

Referring again to FIG. 1A, the primary power supply 17 provides electrical power to the robot 100. Non-limiting examples of power supplies for the power supply 17, or any of the other power supplies disclosed herein, include stand-alone power supplies such as batteries, including rechargeable in non-rechargeable batteries. Examples of rechargeable batteries include NiMH or Li-ion batteries. In some embodiments, the primary power supply 17 includes a transformer and is connected to a power outlet, e.g., an AC power outlet.

Figure 4:
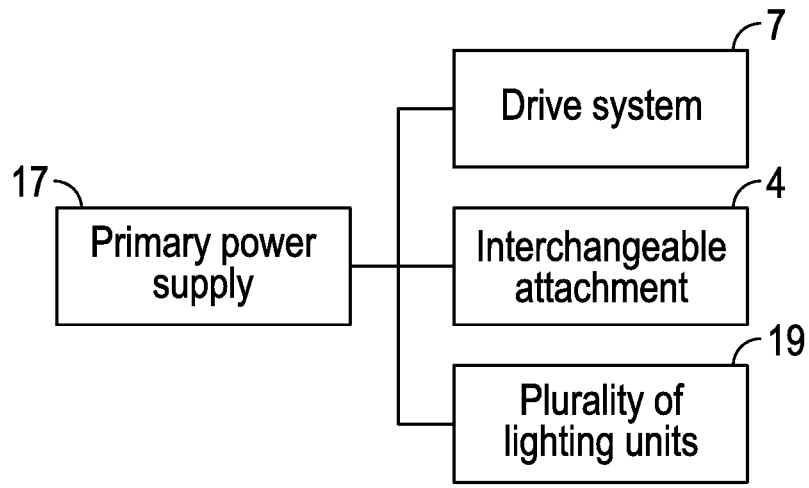
FIG. 4 is an example of a schematic diagram depicting electrical connections for a primary power supply according to some embodiments.

The primary power supply 17 may be externally and removably mounted to the main body 1, opposite to the interchangeable attachments 4a, 4b. Such a configuration may allow the primary power supply 17 to act as a counterbalance to the interchangeable attachments 4a, 4b. The primary power supply 17 may be removed from the main body 1 and replaced when the primary power supply 17 is depleted. The primary power supply 17 may additionally be positioned in a manner such that the primary power supply 17 may be recharged without removing the primary power supply 17 from the main body 1 by docking the robot to a charging station (not illustrated). As shown in FIG. 4, the primary power supply 17 may be electrically connected to the drive system 7 and the interchangeable attachments 4a, 4b, providing electrical power to transport the robot 100 as well as to perform a variety of functions using the interchangeable attachments 4a, 4b.

Figure 1B:
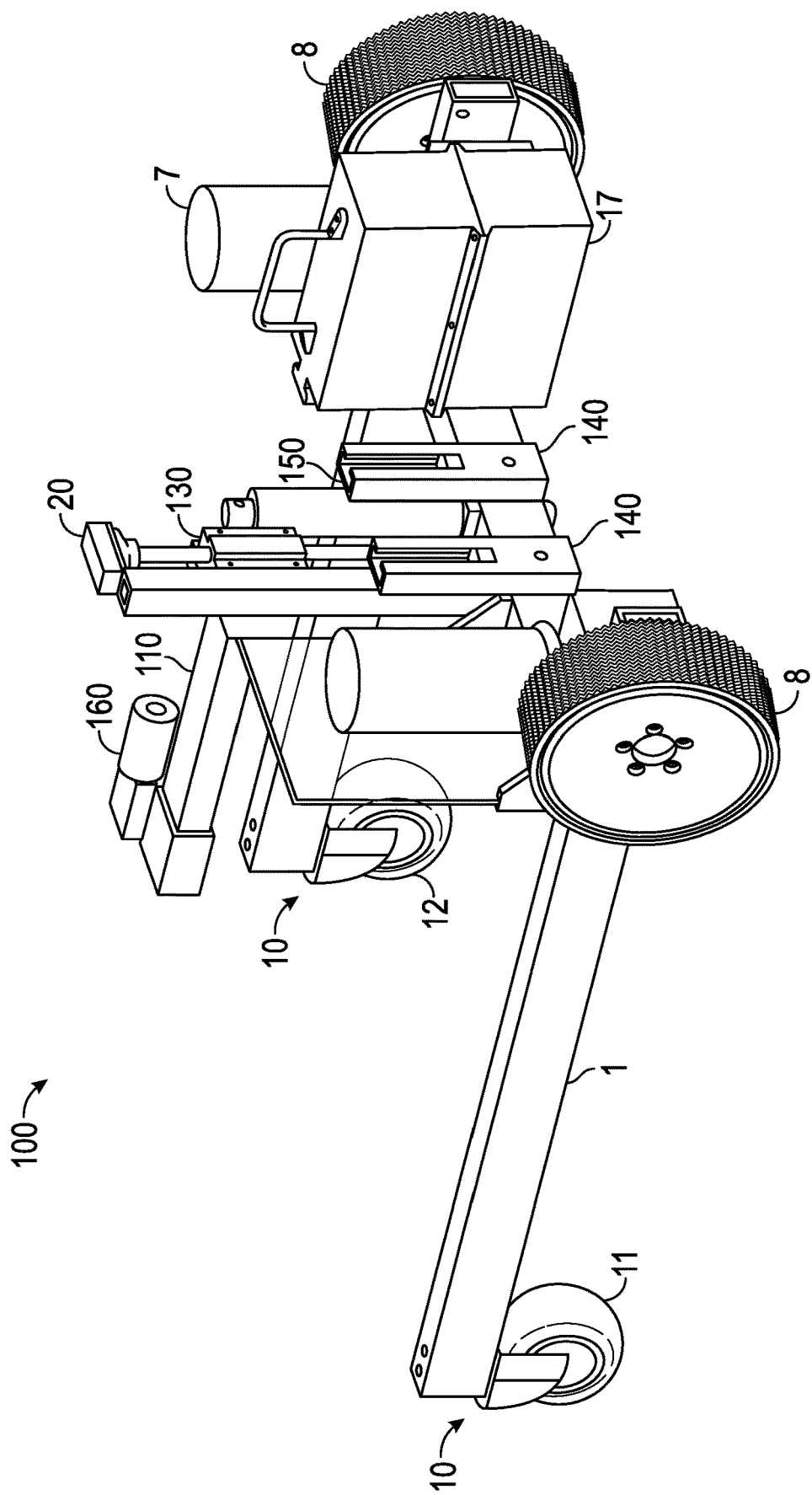
FIGS. 1B-1C are rear perspective views of an example of an autonomous robot, with a loaded and unloaded power supply, respectively, according to some embodiments.
Figure 1C:
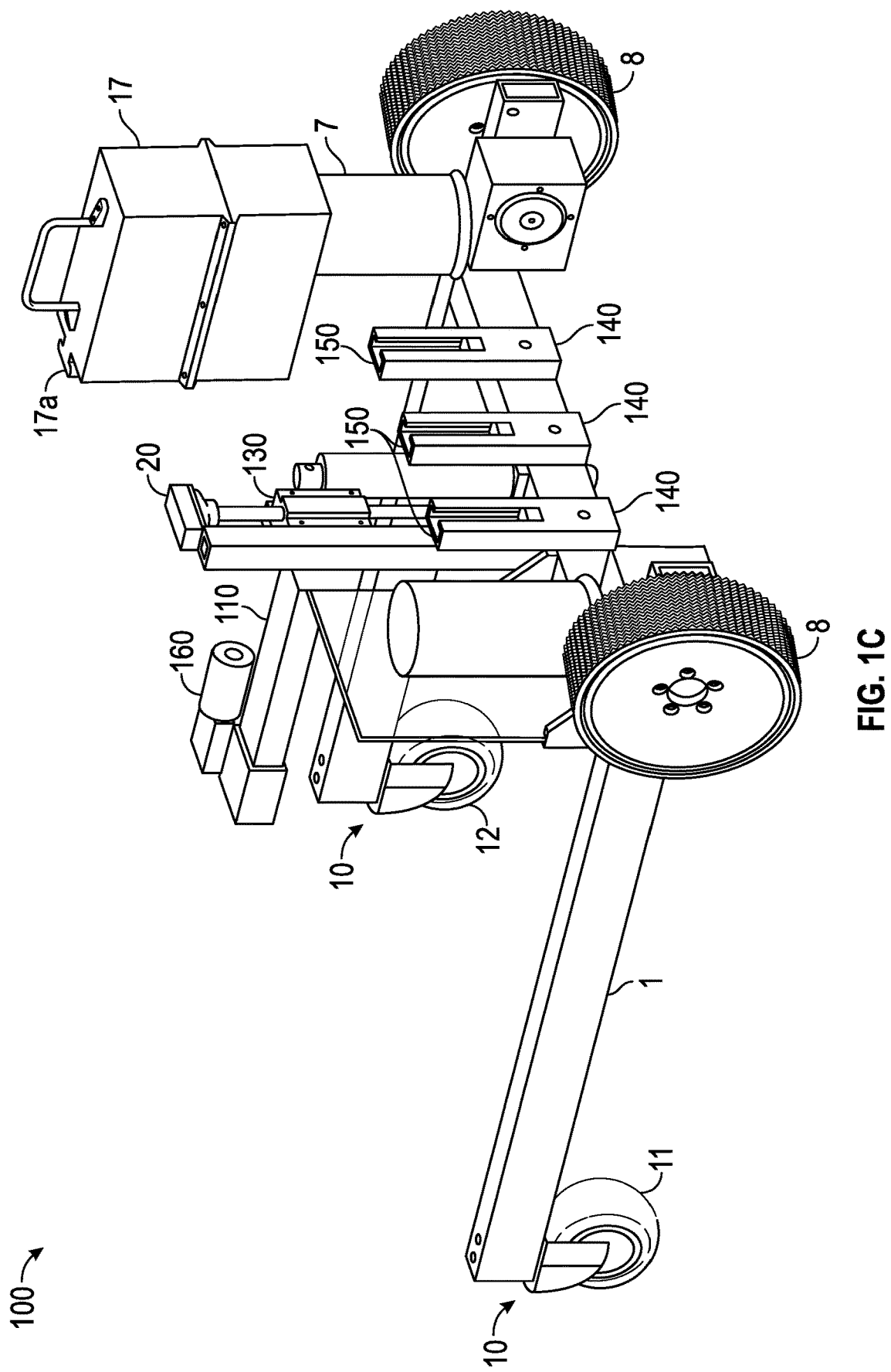

A fastening mechanism for holding the primary power supply 17 in place on the main body 1 may be provided in order to secure the primary power supply 17 in place. FIGS. 1B-1C are rear perspective views of an example of an autonomous robot, with a loaded and unloaded power supply, respectively. For ease of illustration, these figures do not include the interchangeable attachments 4a, 4b. As illustrated, the power supply 17 may be fastened to the main body 1 by attachment to slots 150 of the main body 1. In some embodiments, the slots 150 may be part of vertical extensions 140. The slots 150 may be shaped to mate with a corresponding protrusion 17a on the power supply 17. In some embodiments, multiple slots 150 may be provided to accommodate multiple power supplies 17. In addition, the slots 150 may be utilized to hold functional attachments, e.g., additional interchangeable attachments for performing tasks, and/or counterweights to the interchangeable attachments or power supply 17.

Figure 5:
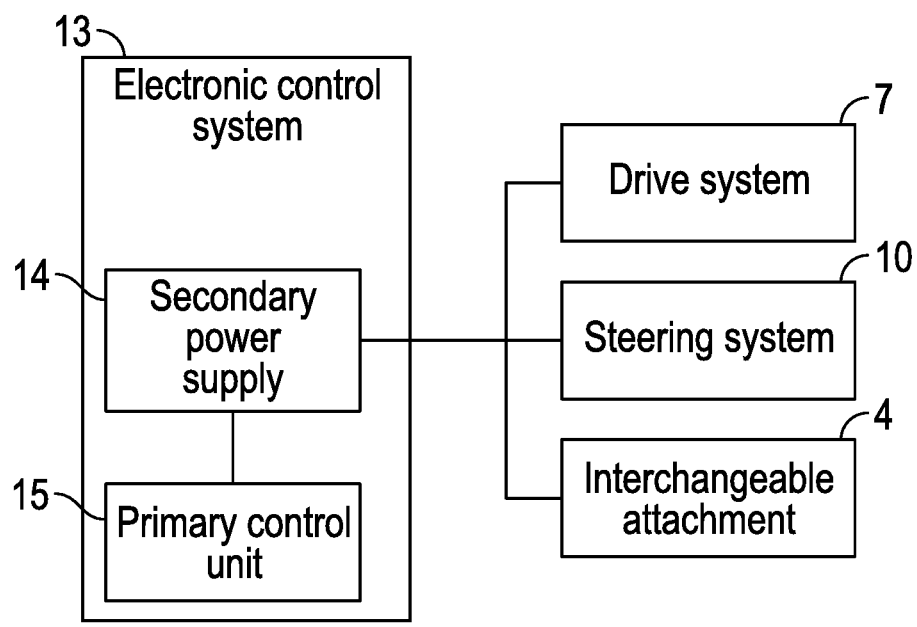
FIG. 5 is an example of a schematic diagram depicting electrical connections for a secondary power supply according to some embodiments.

It will be appreciated that the robot 100 may accommodate a plurality of power supplies. For example, with reference again to FIG. 3 and now also to FIG. 5, the electronic control system 13 may include a secondary power supply 14 in addition to the primary control unit 15. The secondary power supply 14 provides electrical power to the electronic control system 13 and may also be electrically connected to the drive system 7, the support system 10 (in embodiments where the support system 10 includes active components that require power), the interchangeable attachments 4a, 4b, and the primary control unit 15. The secondary power supply 14 provides electrical power to the drive system 7, the support system 10 (again where the support system 10 includes active components that require power), and the interchangeable attachments 4a, 4b in order to enable the robot 100 to remain operational while the primary power supply 17 is replaced upon depletion. The secondary power supply 14 additionally enables the robot 100 itself to replace the primary power supply 17 by providing electrical power and keeping the robot operational when the primary power supply 17 is depleted or removed.

Figure 2A:
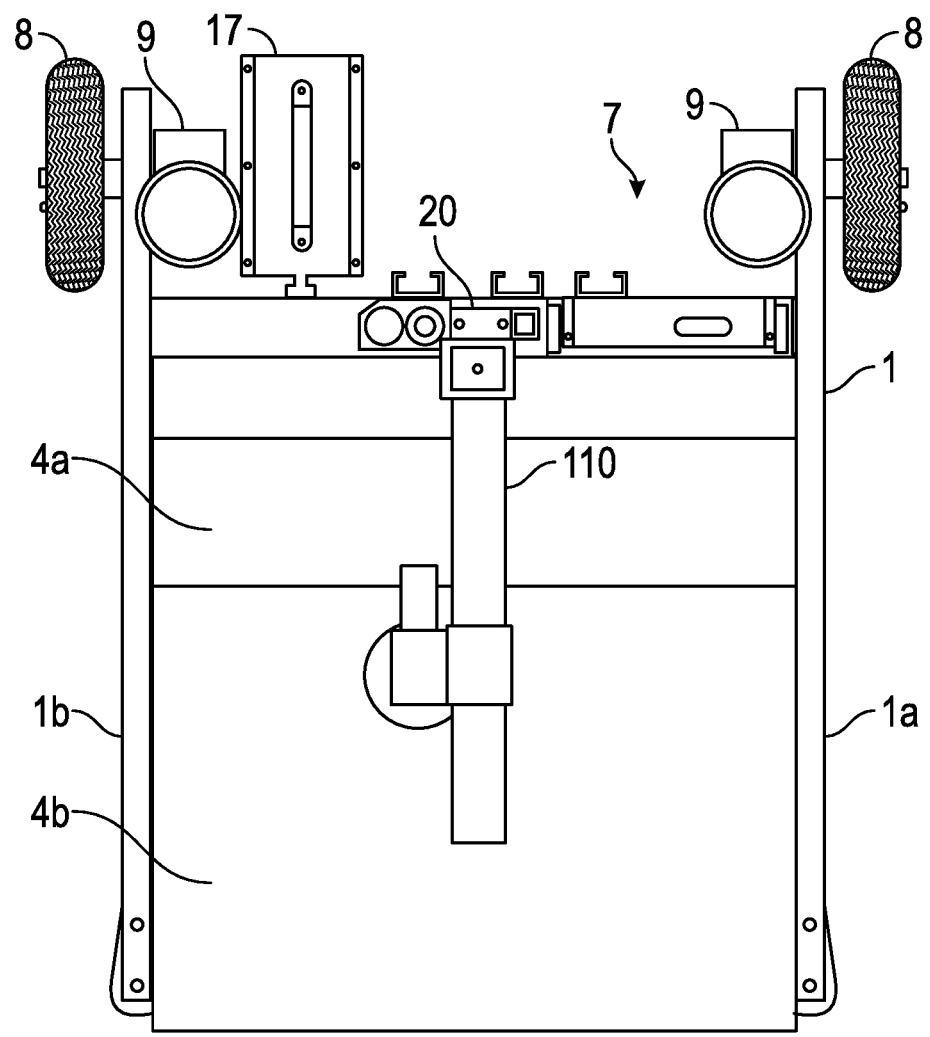
FIGS. 2A-2D are examples of top-down, perspective, back, and side views of the autonomous robot of FIG. 1A.

With reference now to FIGS. 2A-2D, examples of top-down, perspective, back, and side views, respectively, of the robot 100 are illustrated. As shown in FIG. 2A, the drive system 7 comprises a pair of drive wheels 8 and at least one motor 9. The pair of drive wheels 8 allows the robot to traverse across a surface while the at least one motor 9 converts electrical energy from the primary power supply 17 and the secondary power supply 14 into mechanical energy, e.g., the location of the wheels 8. The pair of drive wheels 8 may be torsionally connected to the at least one motor 9, enabling rotation of the pair of drive wheels 8 due to mechanical energy provided by the at least one motor 9. Preferably, the pair of drive wheels 8 is a pair of geared wheels. In some embodiments, each drive wheel from the pair of drive wheels 8 may be driven by its own motor 9. Preferably, the at least one motor 9 includes a gearbox (not illustrated) as well as one or more sensors. The gearbox is configured to alter the torque output of the at least one motor 9 while the sensors are able to monitor the at least one motor 9 as well as to relay data to the electronic control system 13 to facilitate movement of the robot 100.

Figure 2B:
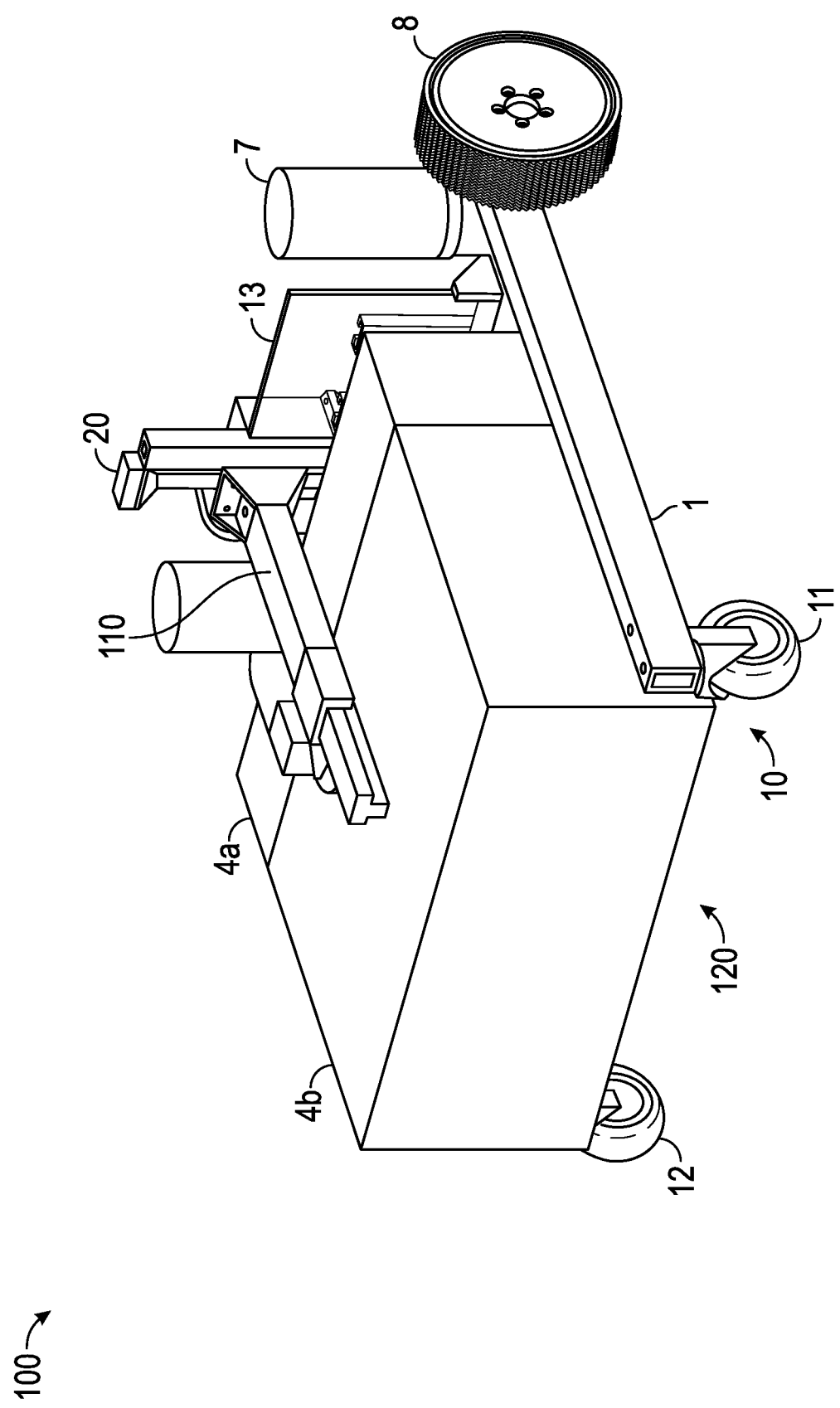
Figure 2C:
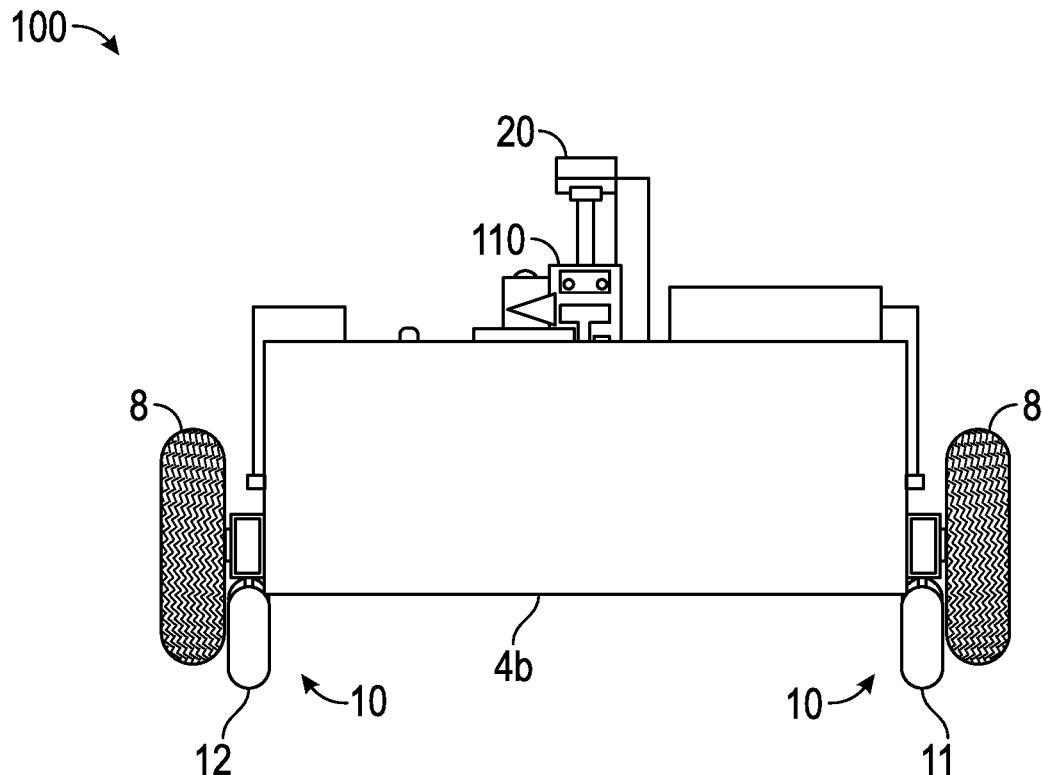
Figure 2D:
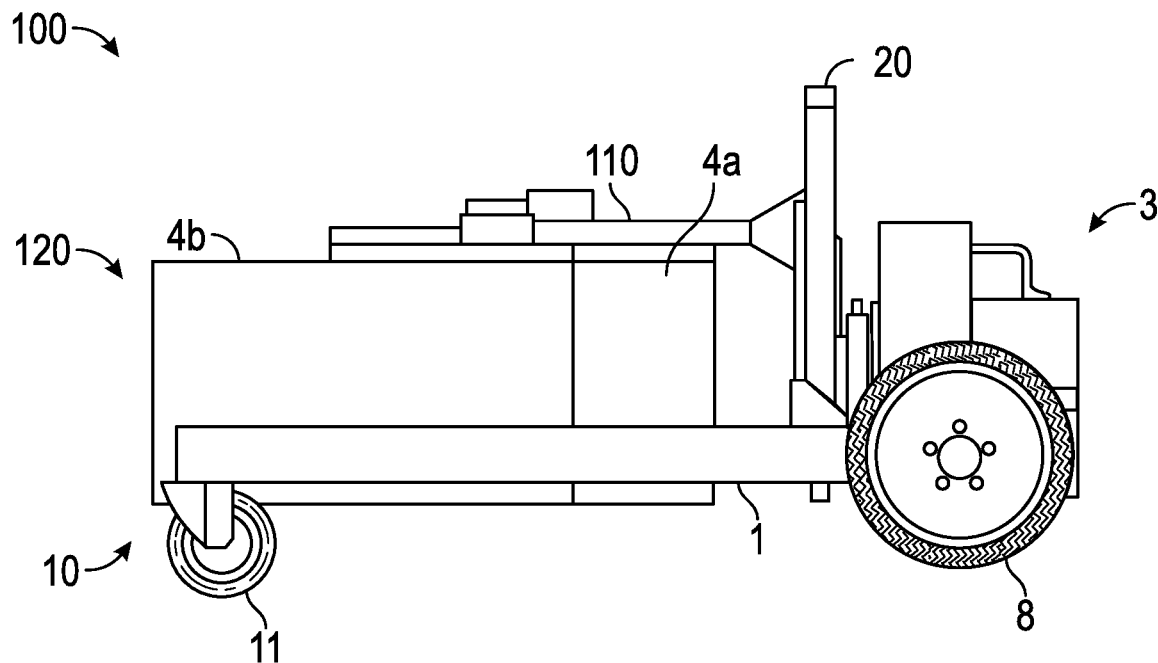

With continued reference to FIGS. 2B-2D, in embodiments where the support system 10 functions as a steering system, the system may comprise a first rotatable wheel 11 and a second rotatable wheel 12. In some embodiments, these wheels 11, 12 may be mounted on frame extensions 1a, 1b, respectively, of the main body 1. As illustrated, these frame extensions 1a, 1b also define an open volume into which the interchangeable attachments 4a, 4b may be accommodated.

The first rotatable wheel 11 and the second rotatable wheel 12 enable the robot to change direction when traveling across a surface. The first rotatable wheel 11 and the second rotatable wheel 12 are mounted proximate to the front end 120 (FIG. 2D), opposite to the drive system 7 along the back end 3. The first rotatable wheel 11 and the second rotatable wheel 12 are thus offset from the drive system 7 and are configured to alter the lateral direction of movement of the robot 100. In some embodiments, the electronic control system 13 is configured to navigate the robot 100 via control of the first rotatable wheel 11 and the second rotatable wheel 12. In some embodiments, the first rotatable wheel 11 and the second rotatable wheel 12 are caster wheels.

In some embodiments, a first tread is wrapped around one wheel of the pair of drive wheels 8 to the first rotatable wheel 11, and a second tread is wrapped around the other wheel from the pair of drive wheels 8 to the second rotatable wheel 12. When present, these treads enable the robot to traverse across more varied or slippery terrain such as snow and ice. In some embodiments, the robot is thus provided mobility in a similar fashion as a tank.

With reference again to FIG. 4, in some embodiments, the robot may also include a plurality of lighting units 19. The plurality of lighting units 19 may be configured to provide illumination in the vicinity of the robot. In some embodiments, the plurality of lighting units may be mounted to the main body 1, proximate to the back end 3. The plurality of lighting units 19 may be adjustable from side to side or up and down. Additionally, the plurality of lighting units 19 may be configured to provide illumination in multiple directions simultaneously. As shown in FIG. 4, the plurality of lighting units 19 may be electrically connected to the primary power supply 17, enabling the primary power supply 17 to provide electrical power to the plurality of lighting units 19. The specific location of the plurality of lighting units 19 may vary as desired in order to suit the functionality and design of the robot 100. For example, the plurality of lighting units 19 may be a plurality of light-emitting diodes (LEDs) that are built directly into the main body 1 in some embodiments.

Because the robot 100 is configured for autonomous operation, it is desirable that it does not become stuck, damaged, or otherwise compromised during operation. With continued reference to FIGS. 2A-2D, the robot 100 may further include one or more sensors 20. The one or more sensors 20 facilitate the autonomous operation of the robot by assisting in its movement. In some embodiments, the one or more sensors 20 are collision detection sensors. In some embodiments, the one or more sensors 20 may be one or more of infrared or other proximity sensors, ground sensors, or line detection sensors. The one or more sensors 20 may be configured to detect if the robot is on a collision course with an object. The one or more sensors 20 may then provide a signal to warn the electronic control system 13 of the impending collision, thereby enabling actions to be taken to prevent a collision. For example, in embodiments where the support system 10 is a steering system, the electronic control system 13 may instruct the support system 10 to steer the robot 100 away from the object. In some embodiments, the area in which the robot 100 is to work may include beacons to help the robot 100 navigate. For example, the work area may include Bluetooth beacons or infrared light emitters, which are detected by the one or sensors 20.

The one or more sensors 20 may be positioned on a front end 2 of the main body 1, enabling the one or more sensors 20 to detect an object in front of the robot as it is traveling across a surface. The plurality of sensors 20 is electronically connected to the electronic control system 13. As such, the one or more sensors 20 are able to communicate with the electronic control system 13 as shown in FIG. 4, allowing the electronic control system 13 to take actions to avoid a collision. The robot 100 may additionally include a bumper (not illustrated) for absorbing impacts. Additional sensors such as bump sensors (not illustrated) may be included in order to determine if the robot 100 has made contact with an object.

In some embodiments, the one or more sensors 20 may include at least one camera to provide a live view of the vicinity of the robot 100. Preferably, the camera is mounted proximate the highest point on the robot 100. In some embodiments, the camera is mounted on the lift mechanism 130, e.g., at a top of the lift mechanism. In addition, preferably, the camera is stationary, e.g., is mounted on a part of lift mechanism that does not move vertically or laterally relative to the main body 1 of the robot 100. In this position, the camera may be utilized to view both the ambient environment and the robot 100. In some embodiments, the robot 100 includes two or more cameras, e.g., one facing forward and one facing backwards. The forward facing camera may scan for obstacles in the path of the robot 100, while the backwards-facing camera may scan for obstacles when the robot 100 is moving backwards. In addition, the backwards-facing camera may be configured to image the interchangeable attachments 4a, 4b, and the robot 100 may be configured to use this information to determine the number and/or sizes of the attachments 4a, 4b. Such a determination may be useful to prevent the tops, e.g., the top corners, of the attachments 4a, 4b from colliding with elevated obstacles. In some embodiments, the camera may be utilized to detect objects, colors, and additional visual factors that aid in autonomous operation of the robot 100. For example, the color green may correspond to grassy terrain while the color blue may correspond to water, allowing the robot to steer away from the water and remain on the grassy terrain. The camera may additionally include infrared imaging, night vision, and/or similar imaging technologies for emitting and detecting light of the emitted wavelength. Thus, the camera may be used as a dimension sensor to determine the size of the robot 100, including the attachments 4a, 4b.

As disclosed herein, the interchangeable attachments 4a, 4b may provide a variety of functionality for the robot 100. In some embodiments, the interchangeable attachments 4a, 4b may include a vacuum cleaner. The vacuum cleaner may be utilized to remove dust, debris, and other small objects from a surface as the robot travels across the surface. In some embodiments, the interchangeable attachments 4a, 4b may include a steam cleaner. The steam cleaner may be configured to clean the surface across which the robot 100 travels. The interchangeable attachments 4a, 4b may include a lawnmower. The lawnmower may be configured to cut plant growth while traveling over the growth. In some embodiments, the interchangeable attachments 4a, 4b may include or may be an additional power supply. The additional power supply may be configured to provide electrical power to the robot 100 beyond the capacity provided by the primary power supply 17 and the secondary power supply 14 (were provided). The additional power supply may be electrically connected to the drive system 7, the support system 10 (in embodiments where the support system 10 includes active components that require power), and the electronic control system 13.

It will be understood that the interchangeable attachments 4a, 4b may include additional components that serve to facilitate the various functions of those attachments. For example, in the case of a lawnmower, the interchangeable attachments 4a, 4b may include a motor as well as an attached blade. It will also be understood that the shape and overall design of the interchangeable attachments 4a, 4b may vary according to the functionality or task to be performed by the interchangeable attachments 4a, 4b. Additional example tasks include, but are not limited to, road painting, transporting goods, and ice resurfacing. The robot 100 may additionally be utilized for military applications such as chemical detection, mine detection, and explosive ordnance disposal (EOD). In addition, the interchangeable attachments 4a, 4b may be an adapter that allows the robot to pick up an object that the adapter is designed to accommodate. Example objects that may be picked up via the adapter include, but are not limited to, garbage containers and clothes bins.

As illustrated in FIG. 1A, the interchangeable attachments 4a, 4b may be disposed sequentially in the path of travel of the robot 100. For example, the interchangeable attachments 4a, 4b may be arrayed one in front of the other, with the interchangeable attachment 4a behind the interchangeable attachment 4b closer to the back end 3 of the robot 100.

Preferably, the tasks performed by the interchangeable attachments 4a, 4b are complementary, with one attachment serving- to increase the efficacy of the other attachment in performing a task. For example, the interchangeable attachment 4a may be a vacuum and the interchangeable attachment 4h may be a steam cleaner. As another example, the interchangeable attachment 4a may be a vacuum or a steam cleaner, and the interchangeable attachment 4b may include a paint dispenser for painting an underlying surface. As yet another example, one of the interchangeable attachments may be an empty container, and the other of the interchangeable attachments may be a device that receives or generates material that requires a volume for storage. In some embodiments, the device generating the material needing storage may be a street sweeper or lawn mower, and the empty container may be used to hold, e.g., material swept up by the sweeper or grass cuttings generated by the lawn mower. When the container is filled, the robot 100 may be configured to switch out the filled container with an empty container, e.g., at a base station.

In some embodiments, the electronic control system 13 may include a digital display (not illustrated) for enabling the user of the robot 100 to view various settings and properties of the robot. The digital display may incorporate touch technology for user input into the electronic control system 13 and/or a physical input device such as a keypad may be present. The display may serve as part of an interface that allows the user to input commands as well as configure the electronic control system 13 and/or the interchangeable attachments 4a, 4b. The electronic control system 13 may further incorporate a microphone to enable the user to input voice commands during operation of the robot. A data storage device may be present as well to allow data collected during operation of the robot to be saved. The data storage 15 may or may not be removable from the robot 100. Data storage ports such as Universal Serial Bus (USB) ports may be present to facilitate data transfer or to allow the robot 100 to be connected to an external computing device. Additionally, the robot 100 may further include a charging port to allow it to be physically connected to an external power source for charging.

As previously discussed, because the primary power supply 17 is externally mounted to the main body 1, the robot 100 may be capable of replacing the primary power supply 17 autonomously in lieu of manual replacement by the user. The robot 100 may be utilized in conjunction with a docking station or similar structure for charging and/or replacing the primary power supply 17. The robot 100 may be configured to autonomously dock with the docking station in order to charge the primary power supply 17. The interchangeable attachments 4a, 4b may be docked to and charged at the docking station as well. This allows the secondary power supply 14 to be charged via the docking station in addition to the primary power supply 17.

Advantageous, robots according to various embodiments disclosed herein may run indefinitely, with the robot constantly swap batteries and interchangeable attachments as the need arises and as job assignments change. As a result, the robot may function as a home cleaning robot, a commercial cleaning robot, an outdoor robot, an indoor robot, etc. which may autonomously change its abilities without the need of human interaction (e.g., from grass cutting with a grass cutting attachment, to moving bins and crates of an adapter for supporting bins and crates, to cleaning driveways with a vacuum and/or sweeping attachment). An example of the operation of the robot is provided below. It will be appreciated that the sequence below maybe performed in the order shown. In addition, omissions of certain actions and/or changes in the order of various actions are also contemplated.

1. The robot may start off at a charging base station with an interchangeable attachment (e.g., a vacuum module) locked to the main chassis or body of the robot through its retention system.
2. The robot may start off with a power supply (e.g., a removable battery) already in place.
3. The robot heads out of the charging base to perform its assignment (in this case vacuuming).
4. When the robot is finished with the assignment, or when the interchangeable attachment is filled to capacity (e.g., when a vacuum module is filled with dust) the robot will return to the base station or another designated drop area, and detach the interchangeable attachment. The detachment may occur via unlock and push-out of the attachment, or by dropping the attachment under the force of gravity.
5. The robot aligns itself to the back of the interchangeable attachment, or wherever the retention adapters are among the interchangeable attachments, moves forwards towards the interchangeable attachment, centers itself (e.g., using sensors such as a camera) and the retention system locks/unlocks the interchangeable attachment as desired. When the robot approaches the base/charging station, at a certain distance is starts a docking procedure. The robot maintains a docking distance from the base station to help itself align to the back of the modular box as well as to the retention system before the robot docks.
6. This docking procedure exists in both retaining and detaching the interchangeable attachments at a designated area or a base/charging station.
7. The base station may help guide the robot via sensors and buttons to dock at the base station and aligned with the retention system. In other words, the base station may provide guidance for the robot to return to the station. In addition, the station may include an actuator that shifts the position of the interchangeable attachment to align with the retention system of the robot.
8. The robot may move towards and locate the base station with a variety of sensors, such as live feed cameras, infrared or other proximity sensors, ground sensors, or line detection sensors that are able to follow "tracks" which may be provided on the ground along the path which the robot is to traverse. The tracks may be, e.g., anything from tape to paint sensors located on the ground.
9. The robot may use a variety of sensors such as live feed cameras and/or infrared or other proximity sensors to help locate, and load and unload the interchangeable attachments at a base station or other designated area.
10. The robot may move to an empty location (e.g., at the base station or at a designated area) and detach its interchangeable attachment. Preferably, this detachment occurs at the location the interchangeable attachment was originally picked up from, e.g., at the space left open when the component was earlier retained by the robot.
11. The robot may then move to another interchangeable attachment for another task. For example, the robot may align itself with a steam cleaning interchangeable attachment located at the base station (e.g., next to or around the vacuum interchangeable attachment), and pick up the steam cleaning interchangeable attachment via the retention system, and then move away from base station to perform the steam cleaning task. In some other embodiments, both the vacuum attachment and the steam cleaning attachment may be loaded onto the robot such that vacuuming and steam cleaning maybe performed without requiring the robot to return to the base station to switch attachments.
12. The robot can navigate with the help of GPS, in addition to other location devices not positioned on the robot itself or the base station to help with returning to an interchangeable attachment for docking and undocking. These are location devices may include Bluetooth beacons or infrared light emitters.
13. In cases where the robot is equipped with a modular, removable power supply, the power supply may be unloaded and a new power supply may be loaded in a procedure similar to the unloading and loading of interchangeable attachments. For example, where the robot has perform various tasks and its attached battery is running low, the robot may: move to a base station containing a charged or charging battery, unload a depleted battery at the base station or designated area, and load another battery.
14. In cases where the robot is not equipped with a modular, removable power supply, the robot may use a variety of sensors to return to the base station for recharging. The robot may return to the base station to recharge, head off to finish its job, or remain at the base station depending on whether a job assignment has been completed.
15. The robot may be charged while retaining an interchangeable attachment. For example, such charging may be performed via connectors built into the robot that send signals and power to both the interchangeable attachments and the robot's main computer system. In some embodiments, charging may occur without the robot retaining any interchangeable attachment.
16. It will be appreciated that the interchangeable attachment may be tracked by the robot using shape/color or design. Such tracking may be utilized to align to the robot for unloading and loading the interchangeable attachment.

In some embodiments, movement of the robot 100 may occur using all of the wheels 8 and 11-12. In some embodiments, all, none, or only a subset of the wheels 8 and 11-12 are rotatable.

In some embodiments, the robot 100 may balance and move on two of its wheels (e.g., the wheels 8), while the front end 120 of the robot 100 is off the ground. It will be appreciated that the robot 100 may include one or more gyroscopes connected to the main body 1. The gyroscopes may aid in keeping the robot 100 balanced once the robot 100 is positioned on two wheels.

The robot 100 may position itself on two wheels using various procedures. As an example, one of the interchangeable attachments may lift up the wheels 11, 12, and the wheels 8 may push the wheels 11, 12 against a surface (e.g., a wall) so that they roll up the surface, until the robot 100 reaches an orientation where it is balanced on the wheels 8. As another example, the wheels 11, 12 may be lifted (e.g., by an interchangeable attachment) and the robot 100 may accelerate sufficiently fast in the direction of the wheels 11, 12 such that those wheels are lifted higher, to a level where the robot 100 is balanced on the wheels 8.

It will be appreciated by those skilled in the art that various omissions, additions and modifications can be made to the processes and structures described above without departing from the scope of the invention. For example, it will be appreciated that the robot 100 has been shown without any side panels or other housing around the functional illustrated components. In some embodiments, a housing or shell may be provided around the illustrated components e.g., to protect these functional components from collisions of external objects, weather, or other external phenomena that may damage these functional components. In addition, the housing may maintain a consistent external appearance and size/shape to the robot, irrespective of the sizes of the interchangeable attachments or the number of retained attachments. This may provide aesthetic benefits and/or allow a consistent interface with other devices external to the robot (e.g., a base station) irrespective of modifications to the internal components or interchangeable attachments. In addition, while various components have been illustrated and discussed as being placed at different locations, it will be appreciated that the relative locations of the various compliments may be varied while still maintaining the functionality disclosed herein. It is contemplated also that various combinations or sub-combinations of the specific features and aspects of the embodiments may be made and still fall within the scope of the description. Various features and aspects of the disclosed embodiments can be combined with, or substituted for, one another in order. All such modifications and changes are intended to fall within the scope of the invention, as defined by the appended claims.

What is claimed is:

1. An autonomous modular robot comprising:
   a main body;
   a drive system attached to the main body and configured to move the main body;
   an attachment retention system configured to couple two or more interchangeable attachments to the main body;
   wherein each of the interchangeable attachments are configured to perform a task;
   wherein the attachment retention system comprises a rail configured to attach to each of the two or more interchangeable attachments; and
   wherein the rail is sized and shaped to couple with the interchangeable attachments;
   a lift mechanism, wherein the attachment retention system is part of the lift mechanism; and
   a control system configured to autonomously control:
   the drive system; and
   the interchangeable attachments upon coupling of the interchangeable attachments to the main body.

2. The autonomous modular robot of claim 1, further comprising a dimension sensor proximate a top of the lift mechanism.

3. The autonomous modular robot of claim 2, wherein the dimension sensor is a camera.

4. The autonomous modular robot of claim 3, wherein the camera is a collision detection sensor.

5. The autonomous modular robot of claim 1, wherein the lift mechanism is configured to laterally extend and retract.

6. The autonomous modular robot of claim 1, further comprising a power supply, wherein the power supply is on a side of the main body opposite the lift mechanism.

7. The autonomous modular robot of claim 6, further comprising an additional power supply, wherein the additional power supply is configured to attach to the lift mechanism.

8. The autonomous modular robot of claim 1, wherein the attachment retention system is configured to couple three or more interchangeable attachments to the main body.

9. The autonomous modular robot of claim 1, wherein the two or more interchangeable attachments comprise a steam cleaner.

10. The autonomous modular robot of claim 1, wherein the two or more interchangeable attachments comprise a vacuum cleaner.

11. The autonomous modular robot of claim 1, wherein the two or more interchangeable attachments comprise a grass cutter.

12. The autonomous modular robot of claim 1, wherein the two or more interchangeable attachments comprise one or more of a driveway sweeper, a snow blower, and a package grabber.

13. The autonomous modular robot of claim 1, wherein the two or more interchangeable attachments comprise a power supply.

14. The autonomous modular robot of claim 1, wherein the two or more interchangeable attachments are configured to perform complementary tasks.

15. The autonomous modular robot of claim 14, wherein the two or more interchangeable attachments comprise a vacuum cleaner and a steam cleaner.

16. The autonomous modular robot of claim 1, wherein the interchangeable attachment comprises a secondary control unit.

17. The autonomous modular robot of claim 1, further comprising one or more navigation sensors.

18. The autonomous modular robot of claim 17, wherein the one or more navigation sensors is selected from the group consisting of a camera, a proximity sensor, a ground sensor and a line detection sensor, or a combination thereof.

19. The autonomous modular robot of claim 1, wherein the drive system comprises:
   one or more drive wheels and at least one motor connected to the drive wheels; and
   one or more rotatable wheels proximate an end of the robot opposite to an end of the robot occupied by the drive wheels.

20. The autonomous modular robot of claim 19, wherein the control system is configured to lift the robot off the rotatable wheels and to balance the robot on the drive wheels.

21. The autonomous modular robot of claim 19, wherein a first rotatable wheel is mounted on a first frame extension of the main body, and a second rotatable wheel is mounted on the second frame extension of the main body, wherein the first and second frame extensions defined an open volume for accommodating the two more interchangeable attachments.

* * * * *